United States Patent
Mendoza Saldivar et al.

(10) Patent No.: US 10,252,602 B2
(45) Date of Patent: Apr. 9, 2019

(54) MECHANISM FOR SUN VISOR EXTENSION

(71) Applicant: Ford Global Technologies, LLC, Dearborn, MI (US)

(72) Inventors: Hector Alberto Mendoza Saldivar, Cuautitlan Izcalli (MX); Eduardo Arturo Aguilar Ruelas, Mexico City (MX)

(73) Assignee: Ford Global Technologies LLC, Dearborn, MI (US)

( * ) Notice: Subject to any disclaimer, the term of this patent is extended or adjusted under 35 U.S.C. 154(b) by 38 days.

(21) Appl. No.: 15/688,409

(22) Filed: Aug. 28, 2017

(65) Prior Publication Data

US 2019/0061484 A1 Feb. 28, 2019

(51) Int. Cl.
*B60J 3/02* (2006.01)

(52) U.S. Cl.
CPC ........... *B60J 3/0208* (2013.01); *B60J 3/0239* (2013.01)

(58) Field of Classification Search
CPC .............................. B60J 3/0278; B60J 3/0239
USPC ....................................................... 296/97.8
See application file for complete search history.

(56) References Cited

U.S. PATENT DOCUMENTS

| | | | |
|---|---|---|---|
| 2,667,222 A | 1/1954 | McCarthy et al. | |
| 3,853,370 A | 12/1974 | Barnhart | |
| 4,810,023 A | 3/1989 | Kawada | |
| 5,316,361 A | 5/1994 | Miller | |
| 5,478,131 A | 12/1995 | Marks | |
| 5,749,618 A | 5/1998 | Jones | |
| 6,585,308 B2 | 7/2003 | Sturt et al. | |
| 7,320,492 B1 | 1/2008 | Rosenbaum | |
| 8,544,933 B1 | 10/2013 | Fuller | |
| 9,770,964 B1 * | 9/2017 | Asai | B60J 3/0278 |
| 2016/0318378 A1 | 11/2016 | Nedelman | |

* cited by examiner

*Primary Examiner* — Pinel E Romain
(74) *Attorney, Agent, or Firm* — Vichit Chea; Price Heneveld LLP

(57) ABSTRACT

A vehicle visor includes a visor body having a recessed track assembly disposed therein. An extension blade is slideably mounted to the visor body between stowed and deployed positions. A connecting member includes first and second ends. The first end is received in the recessed track assembly for sliding movement along a continuous loop of the recessed track assembly. The second end is operably coupled to the extension blade for lateral movement therewith between stowed, deployed and clearance positions.

20 Claims, 8 Drawing Sheets

MECHANISM FOR SUN VISOR EXTENSION

FIELD OF THE INVENTION

The present invention generally relates to a sun visor assembly for a motor vehicle, and more particularly, to a sun visor assembly including a visor blade extension mechanism and an associated deployment and retaining mechanism.

BACKGROUND OF THE INVENTION

Sun visors are generally provided within vehicle interiors and are often mounted to an interior headliner near the A-pillar of the vehicle on a pivoting hinge to block exterior sunlight from entering the vehicle interior. Often, sun visors do not cover enough area to sufficiently block incoming sunlight, such that incoming light can still reach a driver and impair the driver's ability to see. Some visor assemblies do not come with extension blades or the current extension designs are very difficult to manage. Current extension blade designs can become stuck or damaged due to inconsistent deployment mechanisms. Aftermarket extensions must be added to a current sun visor assembly, and can be clumsy designs that are clipped or attached to a sun visor assembly using cords or tape. An easily deployable extension blade is desired having a deployment mechanism that allows for controlled deployment of the extension blade as well as an incorporated retaining mechanism.

SUMMARY OF THE INVENTION

According to one aspect of the present invention, a vehicle visor includes a visor body having a recessed track assembly disposed therein. An extension blade is slideably mounted to the visor body between stowed and deployed positions. A connecting member includes first and second ends. The first end is received in the track assembly for sliding movement therealong. The second end is operably coupled to the extension blade.

Embodiments of the first aspect of the invention can include any one or a combination of the following features:
- the extension blade includes first and second rails slideably received in first and second channels disposed within the visor body, respectively;
- the first and second channels are spaced-apart, and further wherein the visor body includes a slot disposed between and interconnecting the first and second channels;
- the extension blade includes first and second rails and a body portion disposed therebetween, and the body portion of the extension blade is slideably received in the slot of the visor body;
- the first and second channels include first and second cross-sectional configurations, respectively. The first cross-sectional configuration is different than the second cross-sectional configuration. The first and second rails of the extension blade include first and second cross-sectional configurations, respectively. The first cross-sectional configuration of the first rail is different than the second cross-sectional configuration of the second rail;
- the extension blade further includes a handle portion, and further wherein the handle portion abuts the visor body when the extension blade is in the retracted position.
- The connecting member is a flexibly resilient member; and
- a biasing mechanism having a first end coupled to the visor body and a second end coupled the extension blade. The biasing mechanism is operable between at-rest and loaded conditions. The biasing mechanism biases the extension blade towards the stowed position.

According to another aspect of the present invention, a vehicle visor includes a visor body having an inner cavity. A recessed track assembly is disposed within the inner cavity and surrounds a raised interior portion. An extension blade is slideably mounted to the visor body. A connecting member includes a first end engaged with the recessed track assembly and a second end operably coupled to the extension blade for movement therewith.

Embodiments of the second aspect of the invention can include any one or a combination of the following features:
- the first end of the connecting member having an inwardly turned distal end that is received in the recessed track for movement around the continuous loop thereof;
- the raised interior portion having a first detent feature with a distal end. The first end of the connecting member clears the distal end of the first detent feature as the extension blade moves from the stowed position to the deployed position;
- the first end of the connecting member is seated in a stepped portion of the raised interior portion to retain the extension blade in the deployed position; and
- the raised interior portion includes a second detent feature having a distal end, and further wherein the first end of the connecting member clears the distal end of the second detent feature as the extension blade moves from the deployed position to the stowed position.

According to yet another aspect of the present invention, a vehicle visor includes a visor body and an extension blade slideably mounted to the visor body between stowed, deployed and clearance positions. A plate member is disposed within the visor body and includes a recessed track assembly disposed thereon. A connecting member includes a first end engaged with the recessed track assembly, and a second end operably coupled to the extension blade for movement therewith.

Embodiments of the third aspect of the invention can include any one or a combination of the following features:
- the recessed track forming a continuous loop around a raised interior portion of the plate member;
- the raised interior portion of the plate member having a first detent feature that is cleared by the first end of the connecting member when the extension blade is in the clearance position;
- the raised interior portion of the plate member having a stepped portion, wherein the first end of the connecting member is seated in the stepped portion of the raised interior portion of the plate member when the extension blade is in the deployed position;
- a biasing mechanism coupled between the visor body and the extension blade, wherein the biasing mechanism biases the extension blade from the clearance position to the deployed position; and
- the raised interior portion of the plate member having a second detent feature, wherein the first end of the connecting member clears the second detent feature of the raised interior portion of the plate member when the extension blade moves from the deployed position to the clearance position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
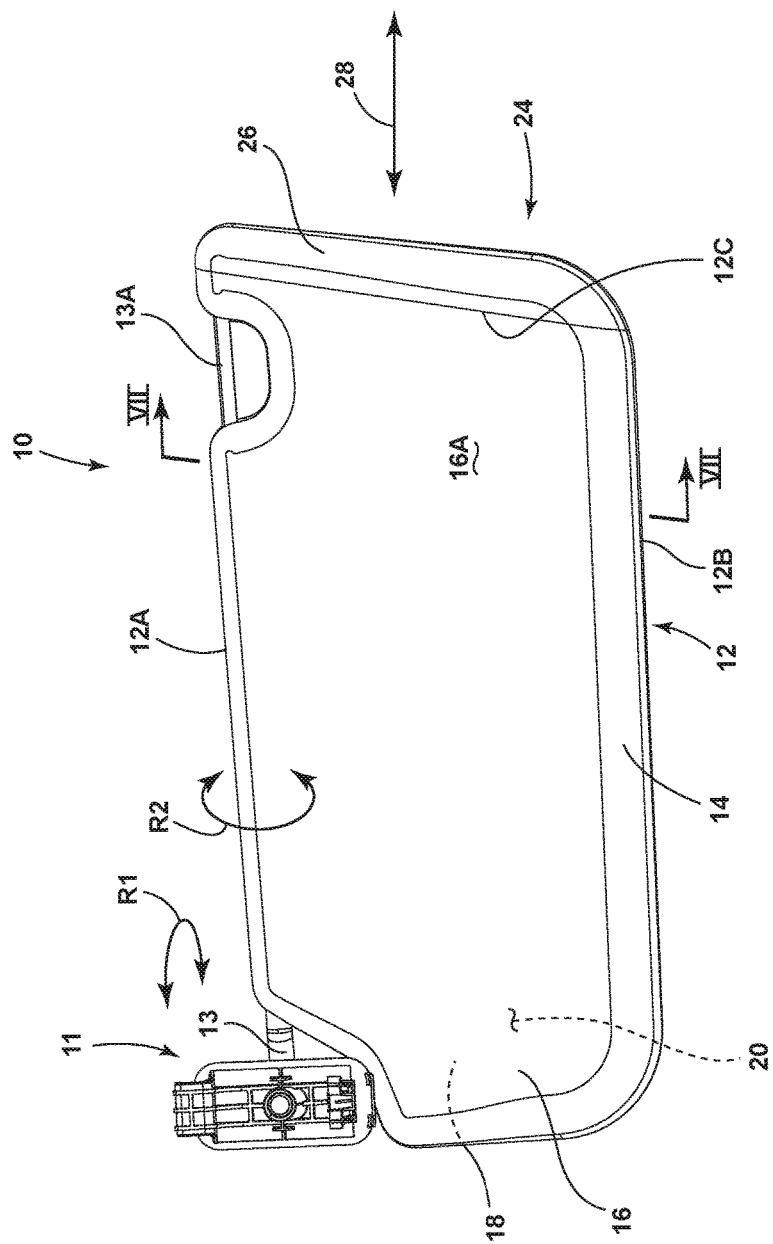
FIG. 1 is a top plan view of a vehicle visor having an extension blade in a stowed position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle visor 10 is shown which may be referred to herein as a visor assembly, visor, or sun visor. The visor 10 includes a visor body 12 that is configured to mount to a headliner of a vehicle near a vehicle windshield. Specifically, the visor 10 mounts to the vehicle headliner at a pivoting mounting assembly 11. The pivoting mounting assembly 11 couples to a mounting bar 13 disposed through an upper portion 12A of the visor body 12. The mounting bar 13 further includes an exposed portion 13A disposed on an opposite side of the mounting bar 13 relative to the pivoting mounting assembly 11. The exposed portion 13A of the mounting bar 13 is configured to releasably couple to a clip assembly mounted to the headliner of a vehicle, such that the visor 10 can pivot between first and second positions along a path as indicated by arrow R1. The visor 10 can also pivot on the mounting bar 13 between raised and lowered positions in a flip-down manner along the path as indicated by arrow R2. In FIG. 1, it is contemplated that the visor 10 is in a lowered position, such that the visor body 12 of the visor 10 can block incoming sunlight to shade a vehicle occupant. It is noted that the pivoting mounting assembly 11 may be disposed in a different configuration than that shown in FIG. 1 when the visor 10 is in the lowered position.

Figure 2A:
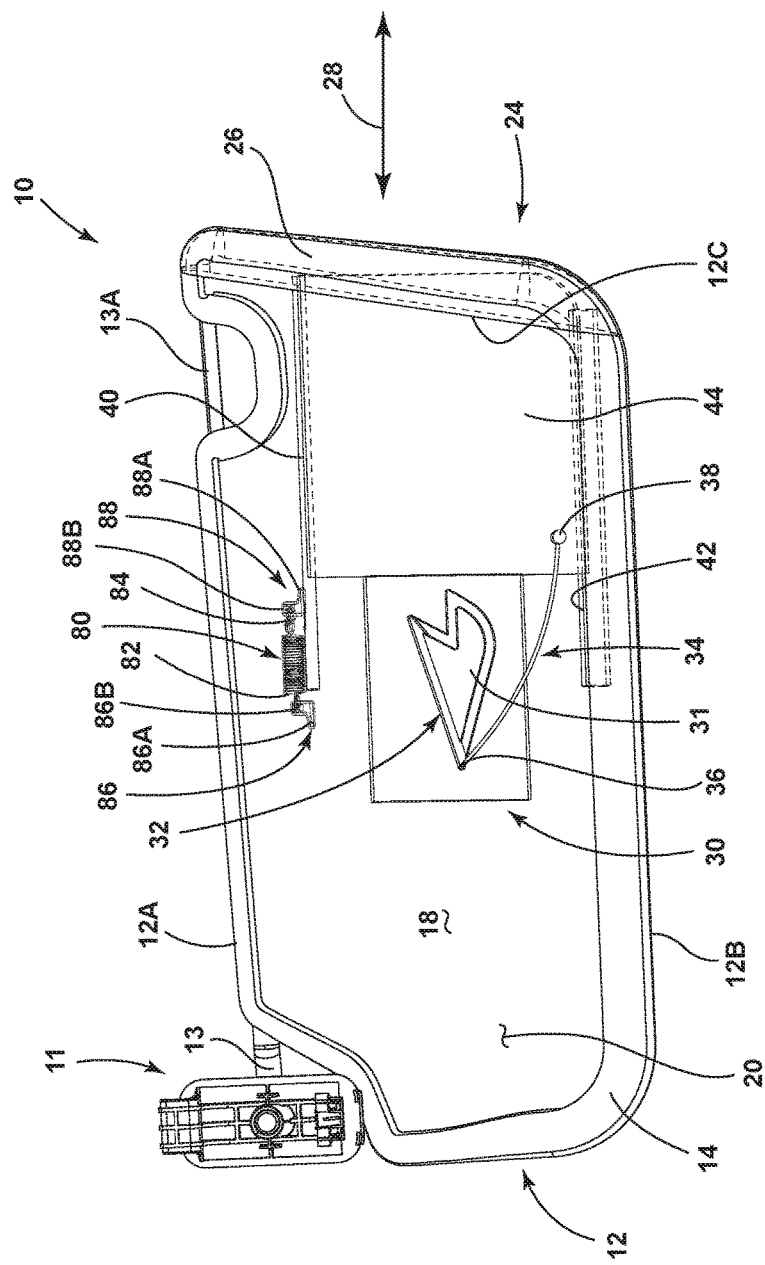
FIG. 2A is a top plan view of the vehicle visor of FIG. 1 with an inner panel removed to reveal the extension blade shown disposed within an inner cavity.

In the embodiment shown in FIG. 1, the visor body 12 of the visor 10 includes an outer frame 14 and an inner panel 16. An outer panel 18 is disposed on an opposite side of the visor body 12 relative to the inner panel 16 as best shown in FIG. 2A. Between the inner and outer panels 16, 18 an inner cavity 20 of the visor body 12 is disposed. In the configuration shown in FIG. 1, the visor body 12 includes the upper portion 12A and a lower portion 12B. Disposed between the upper portion 12A and the lower portion 12B of the visor body 12, the inner panel 16 includes an inner surface 16A. In the embodiment shown in FIG. 1, an extension blade 24 is shown having a handle portion 26 which abuts an outer edge 12C of the visor body 12. The handle portion 26 of the extension blade 24 abuts the outer edge 12C of the visor body 12 of the visor 10 when the extension blade 24 is in the stowed position as shown in FIG. 1, such that the handle portion 26 is accessible to a user outside of the visor body 12 when the extension blade 24 is in the stowed position. The extension blade 24 is configured to move laterally in the direction as indicated by arrow 28 between the retracted position shown in FIG. 1, and an extended position shown in FIG. 2B. The extension blade 24 is contemplated to move to the extended position to provide greater surface area to the visor 10 for blocking an increased amount of incoming light. According to an embodiment of the present invention, the extension blade 24 is deployed to the extended position from the retracted position by a user gasping the handle portion 26 of the extension blade 24 and pulling the extension blade 24 outward in the direction as indicated by arrow 28. Deployment of the extension blade 24 to the extended or deployed position may be assisted with deployment mechanisms of the visor 10, as further described below. Retention of the extension blade 24 in the deployed or extended position may also be assisted by concealed features within the inner cavity 20 of the visor body 12, and further, the retraction of the extension blade 24 may also be assisted by such features, as further described below.

Referring now to FIG. 2A, the visor 10 is shown with the inner surface 16A removed to show the inner cavity 20 of the visor body 12, as well as outer panel 18. With the inner surface 16A removed, a generally centrally disposed plate 30 is shown having a recessed track 32 recessed therein. The plate 30 may be mounted to either the inner panel 16 or the outer panel 18 in assembly, so long as the plate 30 is disposed within the inner cavity 20 of the visor body 12. The recessed track 32 is disposed in a continuous loop having a plurality of portions which interconnect to surround a raised interior portion 31 of the plate 30.

As further shown in FIG. 2A, the extension blade 24 is shown in the stowed position and includes first and second rails 40, 42, which may be referred to herein as upper and lower rails 40, 42. The first and second rails 40, 42 are slideably received within channels disposed within the visor body 12, as further described below. As noted above, the extension blade 24 is operable between extended and retracted positions along the path as indicated by arrow 28. In FIG. 2A, the extension blade 24 is shown in the retracted position. As further shown in FIG. 2A, the first and second rails 40, 42 are spaced-apart with an interconnecting body portion 44 disposed therebetween. The body portion 44 of the extension blade 24 provides for increased sun blocking surface area for the visor 10 when the extension blade 24 is in the extended or deployed position. As further shown in FIG. 2A, the body portion 44 of the extension blade 24 is operably coupled to the recessed track 32 by a connecting member 34. The connecting member 34 includes a first end 36 that is received in the recessed track 32, such that the first end 36 of the connecting member 34 remains coupled with the recessed track 32 and moves around the plurality of portions of the continuous loop of the recessed track 32 as the extension blade 24 moves between stowed and deployed positions. The connecting member 34 further includes a second end 38 that is an opposite end to the first and 36. The second end 38 is operably coupled to the body portion 44 of the extension blade 24. The connecting member 34 is contemplated to be a flexibly resilient connecting member, such that the connecting member 34 defines a spring which interconnects the recessed track 32 of the visor body 12 with the body portion 44 of the extension blade 24. With the extension blade 24 in the stowed position shown in FIG. 2A, the connecting member 34 is contemplated to be in a loaded condition due to a force imparted by a biasing mechanism, as further described below.

As further shown in FIG. 2A, the visor 10 further includes a biasing mechanism 80 that is coupled to the visor body at a first end 82, and further coupled to the extension blade 24 at a second end 84. The biasing mechanism 80 is configured to bias the extension blade 24 to the stowed position from the extended or deployed position. The ability of the biasing mechanism 80 to bias the extension blade 24 towards the stowed position is further described below. In the embodiment shown in FIG. 2A, the biasing mechanism 80 is shown in the form of a coil spring that is mounted to the outer panel 18 at a first mounting assembly 86. Specifically, the first mounting assembly 86 includes a mounting portion 86A which is coupled to the outer panel 18. While the mounting portion 86A of the first mounting assembly 86 is shown coupled to the outer panel 18 in the configuration shown in FIG. 2A, it is contemplated that the first mounting assembly 86 can be coupled to any part of the visor body 12 of the visor 10. The first mounting assembly 86 further includes a raised coupling portion 86B which is coupled to the first end 82 of the biasing mechanism 80. Similarly, the biasing mechanism 80 is coupled to the extension blade 24 at a second mounting assembly 88. The second mounting assembly 88 includes a mounting portion 88A that is coupled to the first rail 40 of the extension blade 24. While the mounting portion 88A of the second mounting assembly 88 is shown coupled to the first rail 40 in the configuration shown in FIG. 2A, it is contemplated that the second mounting assembly 88 may be coupled to any part of the extension blade 24 of the visor 10. The second mounting assembly 88 further includes a raised coupling portion 88B which is coupled to the second end 84 of the biasing mechanism 80. With the extension blade 24 in the stowed position in FIG. 2A, the biasing mechanism 80 is shown in an at-rest position. While the biasing mechanism 80 is shown in FIG. 2A in the form of a coil spring, it is contemplated that any biasing mechanism may be used to bias the extension blade 24 towards the stowed position.

Figure 2B:
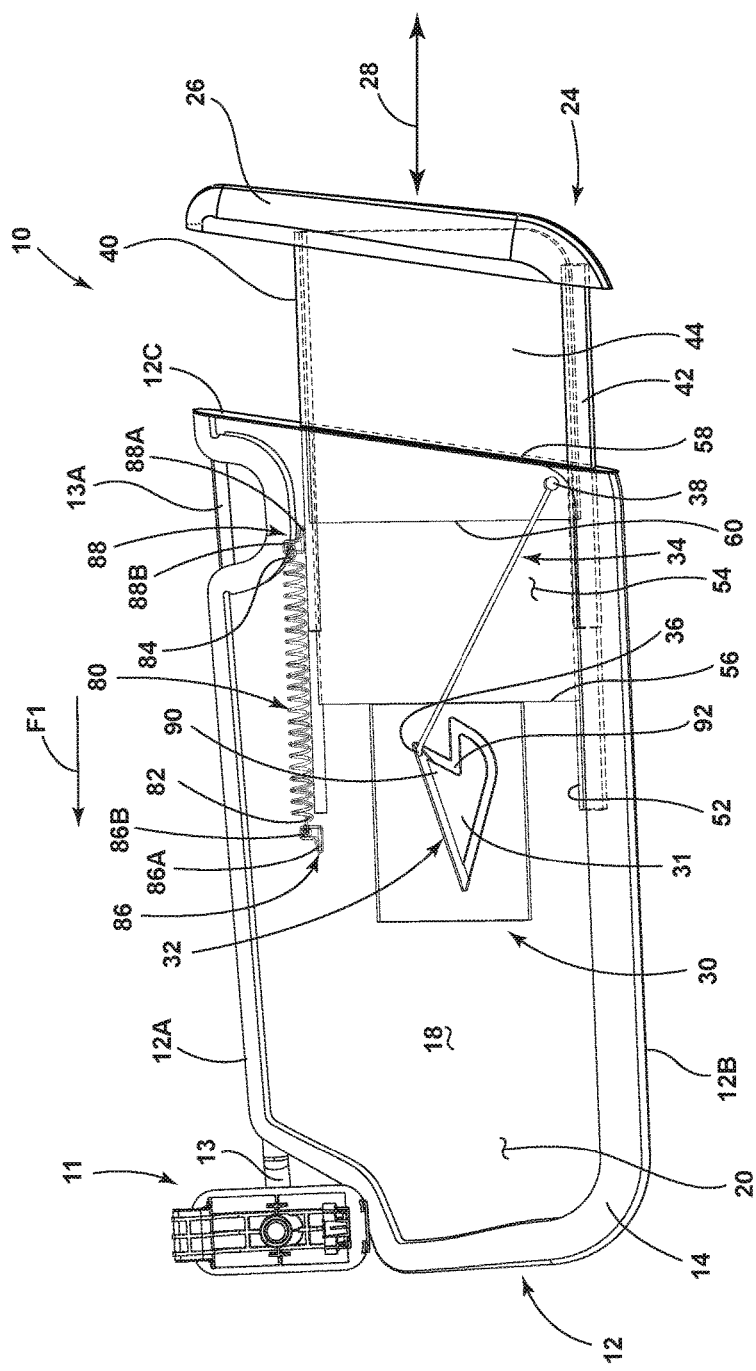
FIG. 2B is a top plan view of the vehicle visor of FIG. 2A with the extension blade in a deployed position.

Referring now to FIG. 2B, the extension blade 24 is shown in a clearance position relative to the visor body 12. With the extension blade 24 extended outwardly from the outer edge 12C of the visor body 12, the body portion 44 of the extension blade 24 provides for increased light blockage for incoming light into the vehicle cabin. As further shown in FIG. 2B, the inner cavity 20 of the visor body 12 includes first and second channels 50, 52 which are configured to slideably to receive the first and second rails 40, 42 of the extension blade 24. As specifically shown in FIG. 2B, the first channel 50 is disposed near the upper portion 12A of the visor body 12, while the second channel 52 is spaced-apart from the first channel 50 and disposed near the lower portion 12B of the visor body 12. The first and second channels 50, 52 may be referred to herein as upper and lower channels that are spaced-apart and interconnected by a slot 54 which is configured to slideably receive the body portion 44 of the extension blade 24 between the stowed and deployed positions. Thus, the first and second rails 40, 42 and the body portion 44 of the extension blade 24 are configured to be received in the first and second channels 50, 52 and the interconnecting slot 54 disposed therebetween, respectively, such that the extension blade 24 can have the first and second rails 40, 42 and the body portion 44 concealed within the inner cavity 20 of the visor body 12 when the extension blade 24 is in the stowed position, as shown in FIG. 1. As further shown in FIG. 2B, the slot 54 includes an end wall 56 and an open front portion 58 that is spaced-apart from the end wall 56. In use, the extension blade 24 enters the inner cavity 20 of the visor body 12 via the open front portion 58 of the slot 54. The body portion 44 of the extension blade 24 includes an inner edge 60 which may abut the end wall 56 of the slot 54 when the extension blade 24 is in the fully stowed position as a stop feature. Further, the handle portion 26 is configured to abut the outer edge 12C and open front portion 58 of the visor body 12 when the extension blade 24 is in the fully stowed position. Thus, in the embodiment shown in FIG. 2B, it is contemplated that a user will have engaged the handle portion 26 of the extension blade 24 to move the extension blade 24 from the retracted or stowed position, shown in FIG. 1, to the extended or deployed position, shown in FIG. 2B, against the biasing mechanism 80. Thus, in moving the extension blade 24 from the stowed position to the deployed position, a user will overcome the force F of the biasing mechanism 80.

As further shown in FIG. 2B, the biasing mechanism 80 is shown in a loaded condition, wherein the biasing mechanism 80 has stretched as the second end 84 of the biasing mechanism 80 moves outwardly with the outward movement of the extension blade 24 along the path as indicated by arrow 28. As stretched out in the embodiment of FIG. 2B, the biasing mechanism 80 is loaded and imparting a force on the extension blade 24 in an inward direction as indicated by arrow F1 towards the stowed position. Thus, the biasing mechanism 80 is configured to bias itself towards the at-rest position shown in FIG. 2A, such that the biasing mechanism 80 imparts an inward force on the extension blade 24 when the biasing mechanism is in the loaded condition shown in FIG. 2B. As further shown in FIG. 2B, the connecting member 34 is shown in an at-rest condition having had the first end 36 thereof moved along an upwardly ascending portion of the recessed track 32. Thus, the connecting member 34 moves from the loaded condition (as shown in FIG. 2A) to the at-rest condition (as shown in FIG. 2B) as the extension blade 24 moves from the stowed position to the deployed position.

Figure 3:
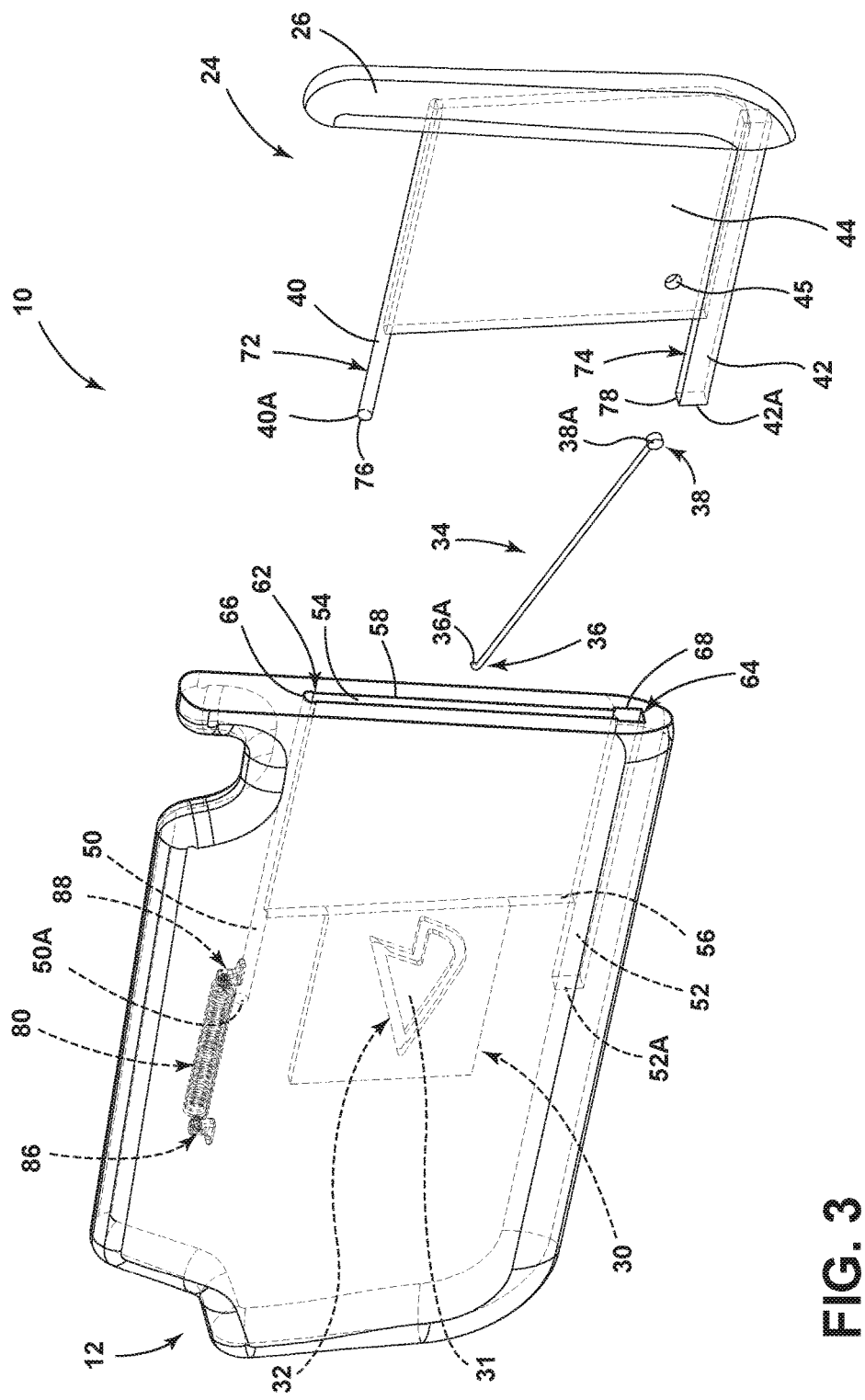
FIG. 3 is a top perspective view of the vehicle visor of FIG. 1 with the extension blade and a connecting member exploded away therefrom.

Referring now to FIG. 3, the extension blade 24 is shown exploded away from the visor body 12, such that the open front portion 58 of interconnecting slot 54 is shown. With the extension blade 24 fully removed from the visor body 12, inwardly disposed distal ends 50A, 52A of the first and second channels 50, 52, respectively, are revealed. As shown in FIG. 3, the distal ends 50A, 52A extend inwardly into the inner cavity 20 of the visor body 12 beyond the end wall 56 of the slot 54. Similarly, the first and second rails 40, 42 of the extension blade 24 include inwardly extending distal ends 40A, 42A, respectively, which inwardly extend beyond the inner edge 60 of the body portion 44 of the extension blade 24. The inwardly extending distal ends 40A, 42A of the first and second rails 40, 42 may also abut the distal ends 50A, 52A of the first and second channels 50, 52, when the extension blade 24 is in the stowed position as a stop feature for the extension blade 24.

As further shown in FIG. 3, the first channel 50 includes a first cross-sectional configuration 62 while the second channel 52 includes a second cross-sectional configuration 64 that is different from the first cross-sectional configuration 62 of the first channel 50. The first cross-sectional configuration 62 of the first channel 50 includes a rounded outer perimeter 66. The second cross-sectional configuration 64 of the second channel 52 includes a non-round outer perimeter 68. As used herein, the term "non-round" is meant to exemplify a cross-sectional configuration having angled edges, such as the rectangle-shaped cross-sectional configuration 64 shown in FIG. 3 with the rectangular-shaped outer perimeter 68. Similarly, the first rail 40 includes a first cross-sectional configuration 72 having a rounded outer perimeter 76. In this way, the first cross-sectional configuration 72 of the first rail 40 is contemplated to be received in the first channel 50 at the first cross-sectional configuration 62 thereof. The first cross-sectional configuration 72 of the first rail 40 is contemplated to be slightly smaller in diameter as compared to the first cross-sectional configuration 62 of the first channel 50, such that the first rail 40 can be slideably received within the first channel 50. Similarly, the second rail 42 includes a second cross-sectional configuration 74 having a non-round outer perimeter 78 that is contemplated to be smaller in diameter than the second cross-sectional configuration 64 of the second channel 52. In this way, the second rail 42 is configured to be slideably received within the second channel 52 of the visor body 12. The first and second rails 40, 42 are contemplated to be appropriately sized, such that they are closely received within the cross-sectional configurations 62, 64 of the first and second channels 50, 52 in assembly. In this way, the engagement of the rails 40, 42 with the channels 50, 52, respectively, provides for guided movement of the extension blade 24 between the extended and retracted positions.

As further shown in FIG. 3, the connecting member 34 includes an inwardly curved distal end 36A at the first end 36 thereof. Further, the connecting member 34 includes an engagement feature 38A disposed at the second end 38 thereof. The engagement feature 38A is configured to couple the connecting member 34 to the body portion 44 of the extension blade 24 at receiving aperture 45 disposed through the body portion 44. It is contemplated that the engagement feature 38A may include any type of fastener to operably couple the second end 38 of the connecting member 34 to the body portion 44 of the extension blade 24. The engagement feature 38A may also include a bend in the connecting member 34 to mechanically couple the second end 38 to the body portion 44 of the extension blade 24. It is further contemplated that the engagement feature 38A allows for the connecting member 34 to pivot at second end 38, as coupled to the body portion 44, as the first end 36 of the connecting member moves horizontally and vertically along the different portions of the recessed track 32 during lateral movement of the extension blade 24. In FIG. 3, the connecting member 34 is shown in the form of a flexibly resilient connecting wire that may comprise a metal material that acts as a spring between the loaded and at-rest conditions shown in FIGS. 2A and 2B, respectively.

Figure 4:
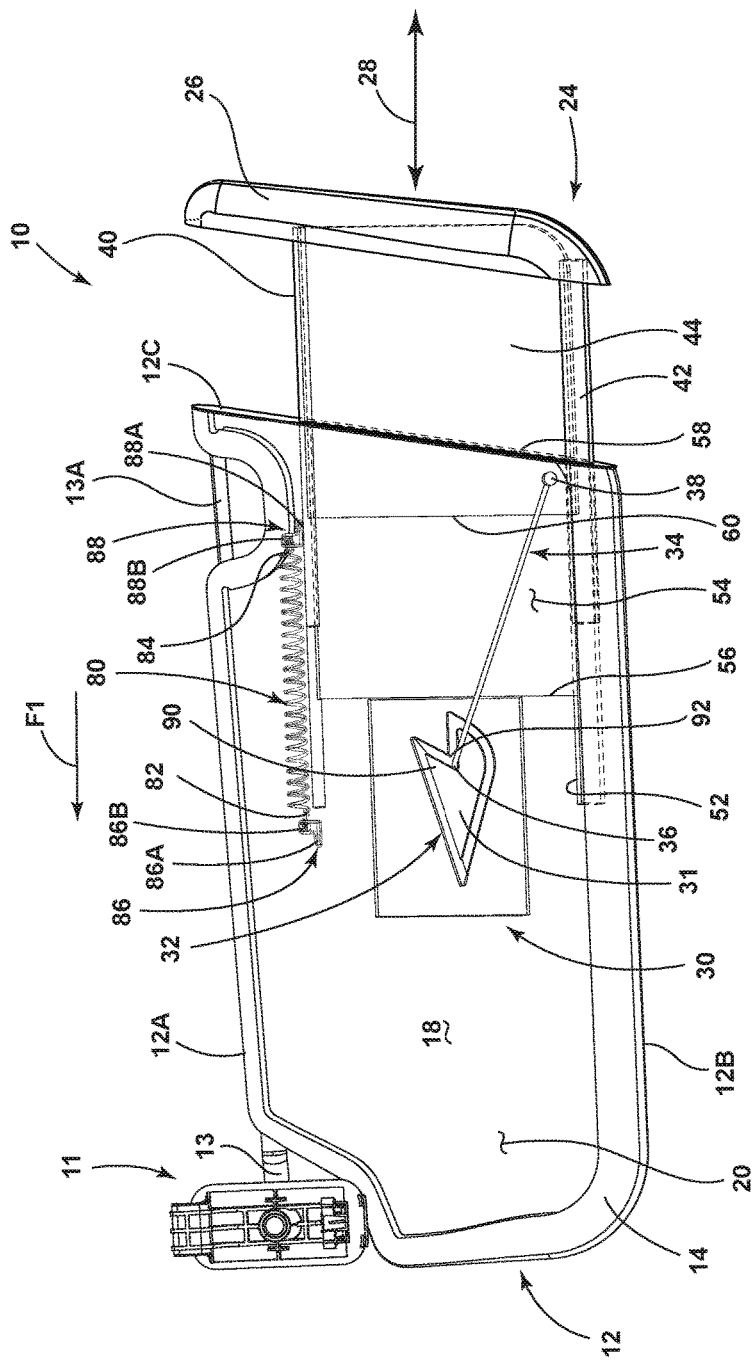
FIG. 4 is a top plan view of the vehicle visor of FIG. 2B with the extension blade in a deployed and retained position.

Referring again to FIG. 2B, the extension blade 24 is shown as being pulled outwardly from the visor body 12 to the clearance position. To retain the extension blade 24 in the deployed position (FIG. 4), the connecting member 34 acts as a retaining mechanism as coupled to the recessed track 32 within the visor body 12. Thus, in the position shown in FIG. 2B, the movement of the extension blade 24 towards clearance position has pulled the connecting member 34 (as coupled to the extension blade 24) outwardly from the position shown in FIG. 2A, such that the first end 36 of the connecting member 34 has moved along the recessed track 32 to clear a detent feature 90 disposed on the raised interior portion 31 of the plate 30 which the recessed track 32 surrounds in a continuous loop. Once the first end 36 of the connecting member 34 has cleared the detent feature 90 by pulling the extension blade 24 to the clearance position, the first end 36 of the connecting member 34 will move towards a stepped portion 92 of the raised interior portion 31 of the plate 30 along the recessed track 32. After the first end 36 of the connecting member 34 has cleared the detent feature 90, the extension blade 24 can be released by a user, such that the extension blade 24 will move inwardly in the direction as indicated by arrow 28 under the force F1 of the biasing mechanism 80 to seat the first end 36 of the connecting member 34 in the stepped portion 92 of the raised interior portion 31 of the plate member 30 along the recessed track 32, as best shown in FIG. 4. Thus, to deploy the extension blade 24, a user will pull the extension blade 24 out from stowed position (FIG. 1) within the visor body 1/2 using the handle portion 26. The extension blade 24 moves laterally from the stowed position to the clearance position (FIG. 2B) so that the first end 36 of the connecting member clears the first detent feature 90. Then, the extension blade 24 is released by the user to again move inwardly from the clearance position to the deployed position shown in FIG. 4, as biased inwardly by the biasing mechanism 80. Thus, the clearance position moves the extension blade outwardly from the visor body 12 to a greater degree than the position of the extension blade 24 when the extension blade 24 is in the deployed position.

In the position shown in FIG. 4, the extension blade 24 is retained in the deployed position by the interaction of the first end 36 of the connecting member 34 being seated in the stepped portion 92 of the raised interior portion 31 of the plate 30. Angled portions of the raised interior portion 31 of the plate 30 help to retain the first end 36 of the connecting member 34 in the stepped portion 92, as further described below. In this way, the extension blade 24 will remain in the deployed position (despite the inwardly pulling force F1 of the biasing mechanism 80), until a user actively removes the first end 36 of the connecting member 34 from the stepped portion 92, as further described below. As used herein, the term "detent feature" is used to describe and identify a physical structure which must be cleared by a moving part (such as the first end 36 of the connecting member 34) in order to detent the moving part in a static position for retention of the moving part in the static position. Further, as used herein, the term "stepped portion" is used to describe and identify a portion of a physical structure that includes angled sections that are substantially L-shaped or about 90° or less.

Figure 5B:
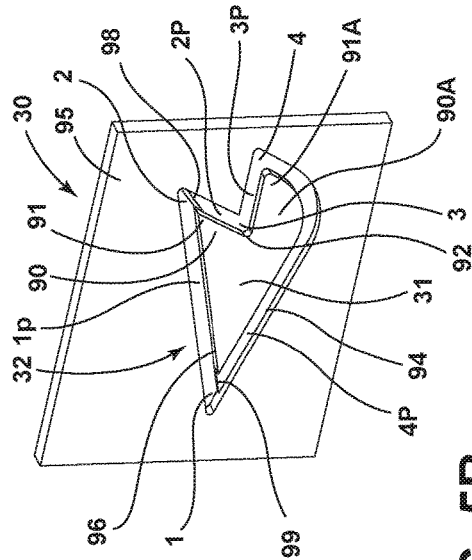
FIG. 5B is a is a top perspective view of the plate member of FIG. 5A taken from a first side.
Figure 5C:
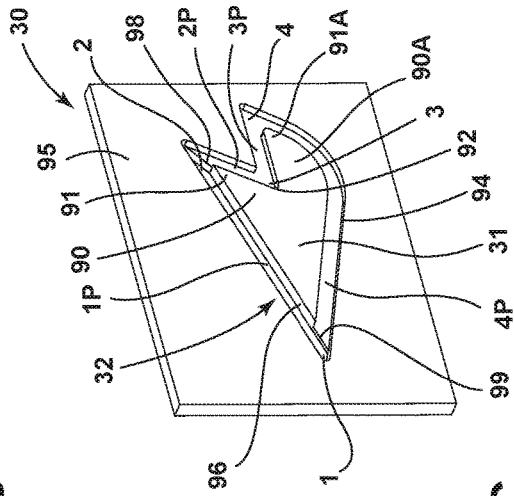
FIG. 5C is a is a top perspective view of the plate member of FIG. 5A taken from a second side.
Figure 5A:
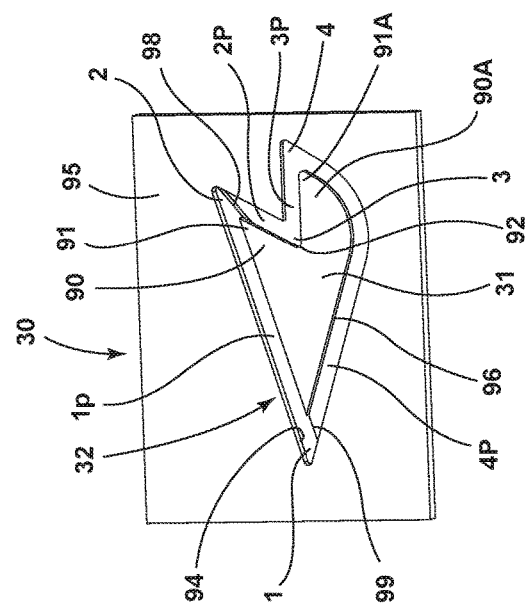
FIG. 5A is a bottom perspective view of a plate member having a recessed track disposed therein as removed from the vehicle visor of FIG. 2A.
Figure 6A:
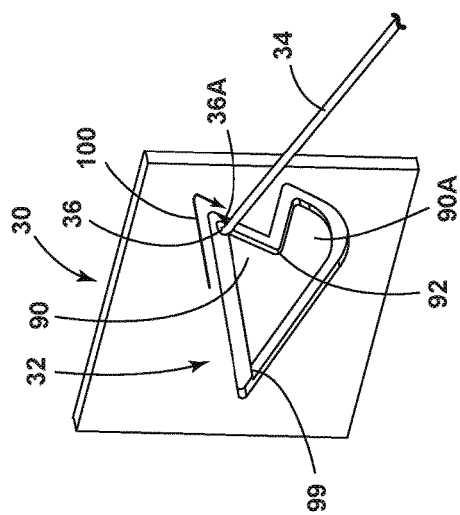
FIGS. 6A-6D are top perspective views of an engagement end of the connecting member of FIG. 3 engaged with the recessed track of the plate member of FIGS. 5A-5C along various portions of the recessed track.

Referring now to FIG. 5A, the plate member 30 is shown from a bottom perspective view with the recessed track 32 disposed therein. In the bottom perspective view of FIG. 5A, the recessed track 32 is shown to be defined between a first sidewall 94, defined by a body portion 95 of the plate member 30, and a second sidewall 96, defined by the raised interior portion 31 which the recessed track 32 surrounds. In the view of FIG. 5A, moving from left to right, the recessed track 32 includes a first point 1 spaced-apart from a second point 2. The first point 1 and the second point 2 are interconnected by a first portion 1P. The first point 1 corresponds to a position along the recessed track 32 in which the first end 36 of the connecting member 34 is located when the extension blade 24 is in the stowed position, as shown in FIGS. 2A and 6D. In moving the extension blade 24 from the stowed position to the deployed position, the first end 36 of the connecting member 34 moves along the first portion 1P of the recessed track 32 from the first point 1 of the recessed track 32 towards the second point 2 of the recessed track 32. As the first end 36 of the connecting member 34 moves along the first portion 1P of the recessed track 32 from the first point 1 towards the second point 2, the first end 36 of the connecting member 34 clears a distal end 91 of the detent feature 90, as shown in FIGS. 6A and 2B. Once the first end 36 of the connecting member 34 clears the distal end 91 of the detent feature 90, the first end 36 of the connecting member 34 moves from the second point 2 of the recessed track 32 towards a third point 3 of the recessed track 32 along a second portion 2P of the recessed track 32. In moving from the second point 2 of the recessed track 32 towards the third point 3, the first end 36 of the connecting member 34 will pass over a ramped portion 98 of the recessed track 32 along the path as indicated by arrow 100 in FIG. 6A. The ramped portion 98 of the recessed track 32 defines an inclined portion of the recessed track 32 that is configured to guide the movement of the first end 36 of the connecting member 34 over the distal end 91 of the detent feature 90, and further along the recessed track 32 towards the third point 3 along the second portion 2P of the recessed track 32. The third point 3 of the recessed track 32 coincides with the stepped portion 92 of the raised interior portion 31. The stepped portion 92 of the raised interior portion 31 is further described below with reference to FIG. 6A. As noted above, when the first end 36 of the connecting member 34 is disposed in the stepped portion 92 of the raised interior portion 31 of the plate member 30, the extension blade 24 is positioned and retained in the deployed position, as shown in FIG. 4. Movement of the first end 36 of the connecting member 34 along the recessed track 32 from the second point 2 towards the third point 3 along the second portion 2P of the recessed track 32 is the result of the force F1 imparted by the biasing mechanism 80 when a user releases the extension blade 24 from the fully deployed position, wherein the first end 36 of the connecting member 34 has cleared the distal end 91 of the detent feature 90, as shown in FIG. 2B. Thus, the inward movement of the extension blade 24 from the position shown in FIG. 2B to the position shown in FIG. 4 moves the first end 36 of the connecting member 34 to the third point 3 of the recessed track 32, which also corresponds to the stepped portion 92 of the raised interior portion 31 of the plate member 30. This movement is shown at arrow 100 in FIG. 6A, as the first end 36 of the connecting member 34 moves to the position shown in FIG. 6B.

Figure 6B:
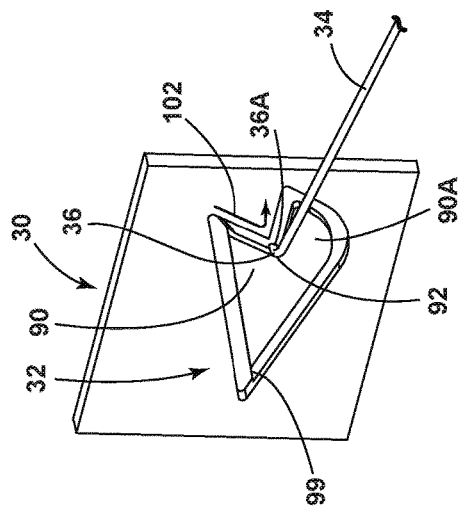
Figure 6C:
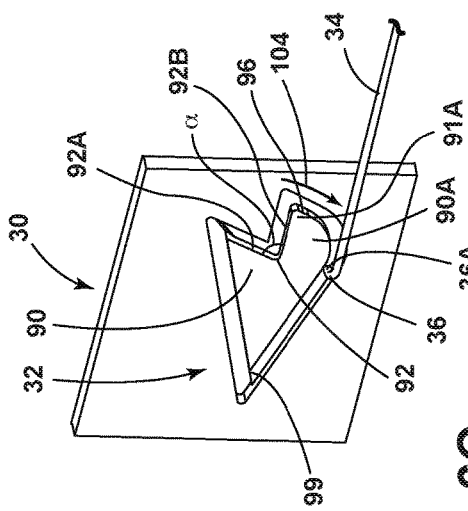
Figure 6D:
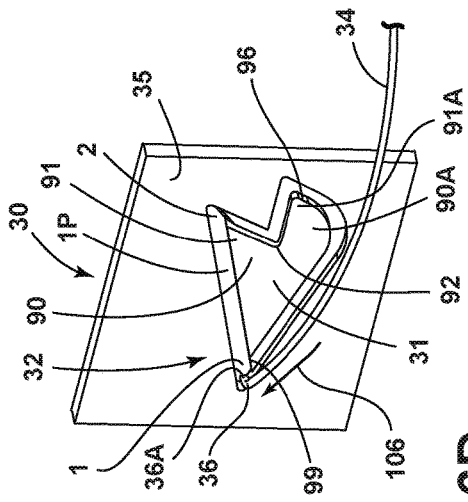

Referring now to FIG. 6B, the first end 36 of the connecting member 34 is shown in the third point 3 of the recessed track 32 at stepped portion 92 of the raised interior portion 31 of the plate member 30. Movement of the first end 36 of the connecting member 34 along the recessed track 32 from the third point 3 towards a fourth point 4 along a third portion 3P of the recessed track 32 is the result of the extension blade 24 (to which the connecting member 34 is attached) being pulled outwardly by a user against the biasing force F1 of the biasing mechanism 80 (FIG. 2B) along the path as indicated by arrow 102 in FIG. 6B. Moving the first end 36 of the connecting member 34 from the third point 3 towards the fourth point 4 along a third portion 3P of the recessed track 32 moves the first end 36 of the connecting member 34 over a second detent feature 90A having a distal end 91A. Moving the extension blade 24 outwardly from the deployed position (FIG. 4) to the clearance position, the first end 36 of the connecting member 34 clears the distal end 91A of the second detent feature 90A at the fourth point 4. The force F1 imparted by the biasing mechanism 80 drives the first end 36 of the connecting member 34 towards the first point 1 along the path as indicated by arrows 104 and 106 of FIGS. 6C and 6D, respectively, when a user releases the extension blade 24 and the extension blade 24 is driven inwardly by the biasing mechanism 80 moving from the loaded condition (FIG. 2A) to the at-rest condition (FIG. 2B). Thus, in this way, the recessed track 32 is a continuous loop from the first point 1 to the fourth point 4, and back to the first point 1 again, as the extension blade 24 moves from the stowed position (FIG. 2A), to the pulled out clearance position (FIG. 2B) (where first end 36 of connecting member 34 clears the first detent feature 90), to the deployed and retained position (FIG. 4) (where first end 36 of connecting member 34 is seated in the stepped portion 92), to the pulled out clearance position (FIG. 2B) (where first end 36 of connecting member 34 clears the second detent feature 90A (FIG. 6C)), to finally return to the stowed position (FIG. 2A).

As shown in FIGS. 5B and 5C, the first end 36 of the connecting member 34 travels over a step 99 disposed along the recessed track 32 between the fourth portion 4P and the first portion 1P. Thus, as best shown in FIGS. 5B and 5C, the first portion 1P of the recessed track 32 is further recessed than the fourth portion 4P, such that the step 99 exist therebetween. The step 99 helps to guide the inwardly curved distal end 36A of the connecting member 34 to the first point 1, and to retain the first end 36 of the connecting member 34 at the first point 1 while the extension blade 24 is in the stowed position. Thus, with the configuration of the recessed track 32, the first end 36 of the connecting member 34 is configured to move around the recessed track 32 in the direction as indicated by arrows 100, 102, 104 and 106 (FIGS. 6A-6D), while the extension blade 24 moves laterally a substantially horizontal manner. The vertical and horizontal movement of the first end 36 of the connecting member 34 is provided by the features of the recessed track 32, such as the ramped portion 98, the stepped portion 92, the rounded lower edge of sidewall 96 along fourth portion 4P, and step 99 between the fourth portion 4P and the first portion 1P. These features guide the first end 36 of the connecting member 34 around the continuous loop of the recessed track 32, such that the extension blade 24 does not bind or otherwise become in operable well moving the extension blade 24 between the stowed and deployed positions. It is contemplated that the inwardly curved distal end 36A of the connecting member 34 is retained in an engaged and fully received position within the recessed track 32 of the plate member by the assembly of the visor body 12, wherein the inner and outer panels 16, 18 can cooperate to keep the first end 36 of the connecting member 34 properly engaged with the recessed track 32 at all times. The engagement of the inwardly curved distal end 36A of the connecting member 34 with the recessed track 32 is best shown in FIGS. 6A-6D. Another guiding feature of the connecting member 34 and the recessed track 32 is the slightly loaded position of the connecting member 34 when the extension blade 24 is in the stowed position, as shown in FIG. 2A, as driven by the force F1 of the biasing mechanism 80. This loaded position puts the first end 36 of the connecting member 34 in an abutting engagement with the sidewall 94 of the plate member 30, such that as the first end 36 of the connecting member 34 moves from the first point 1 to the second point 2, the first end 36 of the connecting member 34 will follow along the sidewall 94 of the plate member 30 along the second portion 2P as the extension blade 24 is pulled towards the deployed position, rather than move downwardly over the step 99 towards the fourth portion 4P of the recessed track 32. In this way, the loaded condition of the connecting member 34 and the step 99 of the recessed track 32 cooperate to keep the first end 36 of the connecting member 34 moving along the proper portion of the recessed track 32 during movement of the extension blade 24 from the stowed position to the deployed position.

As noted above, and with specific reference to FIG. 6C, the stepped portion 92 of the raised interior portion 31 of the plate member 30 includes first and second portions 92A, 92B of the sidewall 96 of the raised interior portion 31 which are disposed at an angle α relative to one another. The angle α is shown as being less than 90° between the first and second portions 92A, 92B of the sidewall 96 of the raised interior portion 31. In this way, the angle of the first portion 92A can help to retain the first end of the connecting member 34 in the stepped portion 92 of the raised interior portion 31 to retain the extension blade 24 in the deployed position so as shown in FIG. 2B.

Figure 7:
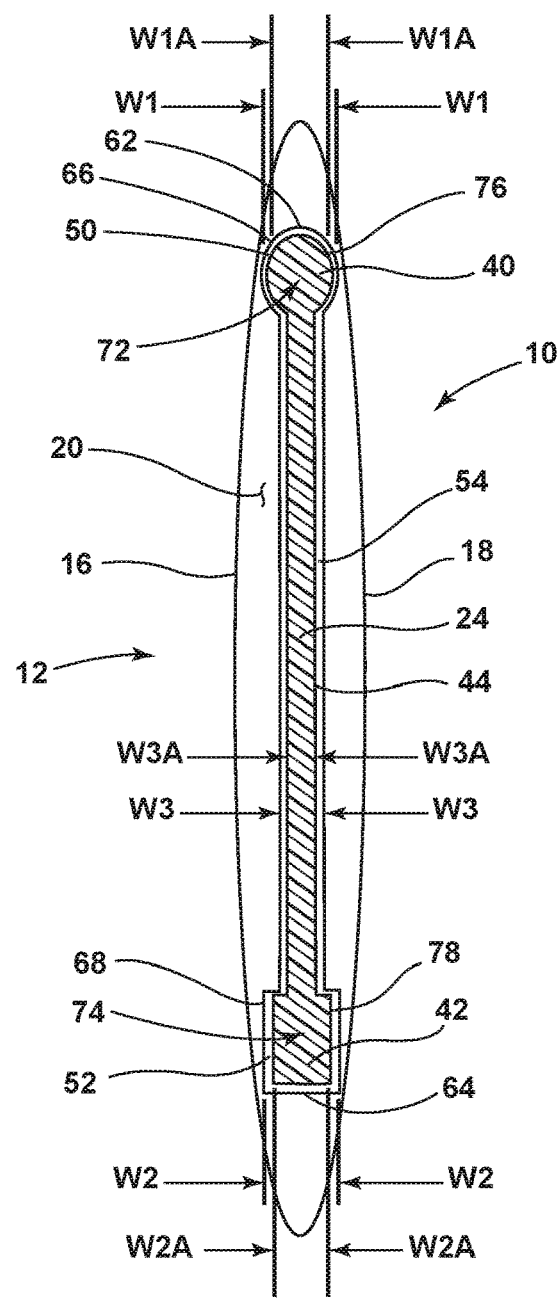
FIG. 7 is a cross-sectional view of the vehicle visor of FIG. 1 taken at line VII.

Referring now to FIG. 7, a cross-sectional view of the visor of FIG. 1 is shown with the extension blade 24 received in the inner cavity 20 of the visor body 12. In FIG. 7, the first cross-sectional configuration 62 of the first channel 50 is shown with the rounded outer perimeter 66. The rounded outer perimeter 66 includes a width W1 which is greater than the width W1A of the rounded outer perimeter 76 of the first rail 40. The first rail 40 is also shown with the rounded first cross-sectional configuration 72, such that the first rail 40 is closely received within the first channel 50. Similarly, the second cross-sectional configuration 74 of the second rail 42 is shown with the non-round outer perimeter 78 in a rectangular shape having a width W2A that is slightly less than the width W2 of the second cross-sectional configuration 64 of the second channel 52 having the non-round outer perimeter 68. In this way, the second rail 42 is closely received within the second channel 52. Finally, the body portion 44 of the extension blade 24 is shown closely received within the slot 54 disposed between and interconnecting the first channel 50 and the second channel 52. The body portion 44 of the extension blade 24 includes a width W3A that is less than the width W3 of the slot 54, such that the body portion 44 is closely received within the slot 54 disposed within the inner cavity 20 of the visor body 12. Thus, the overall configuration of the first and second channels 50, 52 and the interconnecting slot 54 disposed therebetween provides for a guided recess in which the specific portions of the extension blade 24 are closely received to allow for consistent movement of the extension blade 24 between the extended and retracted positions. This guided movement helps the extension blade 24 to move freely between the extended and retracted positions without binding, as little play is allowed for between the first and second rails 40, 42 and channels 50, 52, as well as the body portion 44 of the extension blade 24 and the slot 54.

As further shown in FIG. 7, the recess within the visor body 12 includes an hour-glass shape, wherein the width W1 of the rounded outer perimeter 66 of the first channel 50, and the width W2 of the non-round outer perimeter 68 of the second channel 52 are both greater than the width W3 of the interconnecting slot 54. Similarly, the extension blade 24 includes an hour-glass shape as well, wherein the width W1A of the rounded outer perimeter 76 of the first rail 40, and the width W2A of the non-round outer perimeter 78 of the second rail 42 are both greater than the width W3A of the interconnecting body portion 44. Thus, the outer surfaces of the body portion 44 of the extension blade 24 are inset from the rounded outer perimeter 76 of the first rail 40 and the non-round outer perimeter 78 of the second rail 42. With outer perimeters of the rails 40, 42 and channels 50, 52 being different from one another, the extension blade 24 includes a variety of surfaces that act as guiding mechanisms against various twisting forces. Further, assembly of the extension blade 24 into the visor body 12 is directional, by the variations in the mechanical configuration of the rails 40, 42 and channels 50, 52.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle visor, comprising:
a visor body having a recessed track assembly disposed therein;
an extension blade slideably mounted to the visor body between stowed and deployed positions; and
a connecting member having first and second ends, wherein the first end is received in the track assembly for sliding movement therealong, and further wherein the second end is operably coupled to the extension blade.

2. The vehicle visor of claim 1, wherein the extension blade includes first and second rails slideably received in first and second channels disposed within the visor body, respectively.

3. The vehicle visor of claim 2, wherein the first and second channels are spaced-apart, and further wherein the visor body includes a slot disposed between and interconnecting the first and second channels.

4. The vehicle visor of claim 3, wherein the extension blade further includes a body portion disposed between and interconnecting the first and second rails, and further wherein the body portion of the extension blade is slideably received in the slot of the visor body.

5. The vehicle visor of claim 4, wherein the first and second channels include first and second cross-sectional configurations, respectively, wherein the first cross-sectional configuration is different than the second cross-sectional configuration, and further wherein the first and second rails of the extension blade include first and second cross-sectional configurations, respectively, wherein the first cross-sectional configuration of the first rail is different than the second cross-sectional configuration of the second rail.

6. The vehicle visor of claim 1, wherein the extension blade further includes a handle portion, and further wherein the handle portion abuts the visor body when the extension blade is in the stowed position.

7. The vehicle visor of claim 1, wherein the connecting member is a flexibly resilient member.

8. The vehicle visor of claim 1, including:
a biasing mechanism having a first end coupled to the visor body and a second end coupled the extension blade, wherein the biasing mechanism is operable between at-rest and loaded conditions, and further wherein the biasing mechanism biases the extension blade towards the stowed position.

9. A vehicle visor, comprising:
a visor body having an inner cavity;
a recessed track assembly disposed within the inner cavity, wherein the recessed track assembly surrounds a raised interior portion;
an extension blade slideably mounted to the visor body; and
a connecting member having a first end engaged with the recessed track assembly, and a second end operably coupled to the extension blade for movement therewith.

10. The vehicle visor of claim 9, including:
a biasing mechanism having a first end coupled to the visor body and a second end coupled the extension blade, wherein the extension blade is laterally movable between stowed and deployed positions relative to the visor body, and further where the biasing mechanism biases the extension blade towards the stowed position.

11. The vehicle visor of claim 10, wherein the first end of the connecting member includes an inwardly curved distal end that is received in the recessed track assembly for movement around a continuous loop thereof.

12. The vehicle visor of claim 11, wherein the raised interior portion includes a first detent feature having a distal end, and further wherein the first end of the connecting member clears the distal end of the first detent feature as the extension blade moves from the stowed position to the deployed position.

13. The vehicle visor of claim 12, wherein the first end of the connecting member is seated in a stepped portion of the raised interior portion when the extension blade is in the deployed position to retain the extension blade in the deployed position.

14. The vehicle visor of claim 13, wherein the raised interior portion includes a second detent feature having a distal end, and further wherein the first end of the connecting member clears the distal end of the second detent feature as the extension blade moves from the deployed position to the stowed position.

15. A vehicle visor, comprising:
a visor body;
an extension blade slideably mounted to the visor body between stowed, deployed and clearance positions;
a plate member disposed within the visor body and having a recessed track assembly disposed thereon; and
a connecting member having a first end engaged with the recessed track assembly, and a second end operably coupled to the extension blade for movement therewith.

16. The vehicle visor of claim 15, wherein the recessed track assembly forms a continuous loop around a raised interior portion of the plate member.

17. The vehicle visor of claim 16, wherein the raised interior portion of the plate member includes a first detent feature that is cleared by the first end of the connecting member when the extension blade is in the clearance position.

18. The vehicle visor of claim 17, wherein the raised interior portion of the plate member includes a stepped portion, and further wherein the first end of the connecting member is seated in the stepped portion of the raised interior portion of the plate member when the extension blade is in the deployed position.

19. The vehicle visor of claim 18, including:
a biasing mechanism coupled between the visor body and the extension blade, wherein the biasing mechanism biases the extension blade from the clearance position to the deployed position.

20. The vehicle visor of claim 19, wherein the raised interior portion of the plate member includes a second detent feature, and further wherein the first end of the connecting member clears the second detent feature of the raised interior portion of the plate member when the extension blade moves from the deployed position to the clearance position.

* * * * *